United States Patent [19]

Koerner

[11] 4,449,115
[45] May 15, 1984

[54] APPARATUS FOR DETECTING FERROMAGNETIC MATERIAL

[75] Inventor: Ralph J. Koerner, Pomona, Calif.

[73] Assignee: Minnesota Mining and Manufacturing Company, Saint Paul, Minn.

[21] Appl. No.: 519,214

[22] Filed: Aug. 2, 1983

Related U.S. Application Data

[63] Continuation of Ser. No. 310,764, Oct. 13, 1981, which is a continuation-in-part of Ser. No. 197,173, Oct. 15, 1980, abandoned.

[51] Int. Cl.³ .............................................. G08G 1/01
[52] U.S. Cl. .................................... 340/941; 340/551; 340/568
[58] Field of Search .................... 340/38 L, 568, 551

[56] References Cited

U.S. PATENT DOCUMENTS

| | | | |
|---|---|---|---|
| 3,249,915 | 5/1966 | Koerner | 340/38 L |
| 3,319,161 | 5/1967 | Beynon | 324/47 |
| 3,775,742 | 11/1973 | Koerner et al. | 340/38 L |
| 3,825,889 | 7/1974 | Koerner | 340/38 L |
| 3,984,764 | 7/1974 | Koerner | 340/38 L |
| 3,989,932 | 11/1976 | Koerner | 340/38 L |

*Primary Examiner*—Glen R. Swann, III
*Attorney, Agent, or Firm*—Donald M. Sell; James A. Smith; William D. Bauer

[57] ABSTRACT

A convertor is used having an impedance responsive to the magnetic field intensity of the earth. The convertor may be coupled to a detector for monitoring the impedance of the convertor and generating a call signal responsive to the change in impedance. Generally, the impedance is primarily inductance and the detector is an oscillator using the convertor in a resonant circuit with a frequency monitor coupled to the detector. The convertor is an open magnetic structure having a non-linear BH curve biased by the earth's magnetic field. The open magnetic structure is a core of a highly permeable material which approaches saturation under the influence of the earth's magnetic field, with the axis of the core at least partially aligned with the magnetic flux lines of the earth's magnetic field, and a coil wound around the axis of the core.

40 Claims, 17 Drawing Figures

APPARATUS FOR DETECTING FERROMAGNETIC MATERIAL

PRIOR APPLICATIONS

The subject application is a continuation and claims prior benefit of U.S. patent application, Ser. No. 310,764, filed Oct. 13, 1981, which is a continuation-in-part and claims prior benefit, in part, of U.S. patent application Ser. No. 197,173 filed Oct. 15, 1980 in the name of Ralph J. Koerner, now abandoned.

BACKGROUND OF THE INVENTION

The present invention relates generally to ferromagnetic material detectors and more particularly to ferromagnetic material detectors which operate due to changes in impedance and still more particularly which operate due to changes in inductance.

It is desirable to detect the presence or passage of ferromagnetic materials in or through a surveillance area. One example of a ferromagnetic material which is intended to be detected is the presence or passage of vehicles in a traffic roadway. It is generally desirable to detect such vehicles to control traffic actuated signals, to count the number of vehicles passing a given point in a roadway or to detect the movement of vehicles along a surveillance area on a roadway. A second example of ferromagnetic materials which may be detected are ferromagnetic objects at security checkpoints. Notable examples of this detector are airport security screens in which boarding passengers to commerical airline flights are searched for ferromagnetic objects, which may include firearms or knives or other weapons.

One means of detecting the presence or passage of ferromagnetic materials relative to a surveillance area is through the use of inductive loops. Such inductive loops are widely used in traffic control situations. Typically a loop of wire is buried in the roadway in proximity to a surveillance area. Typically this loop is approximately six feet (1.83 meters) by six feet (1.83 meters) square and contains approximately three turns. The loop thus constructed is excited with an alternating current and the loop is coupled to a resonant circuit. The presence of a ferromagnetic material, or a vehicle, causes the inductance of the loop to change. The change in inductanct in turn causes the frequency of the resonant circuit to change which may be detected with a suitable detector.

The loop so buried in a roadway near a surveillance area is utilized essentially as an "air core" inductor. Capacitors are then coupled to the loop and included as part of an oscillator to produce a resonant circuit. Small changes in the value of the loop inductance caused by the presence of vehicles will effect a slight change in the resonant frequency. The presence or passage of a vehicle in proximity to the sensing loop causes the loop inductance to decrease. Small eddy currents are generated in the mass of the vehicle by transformer coupling. These eddy currents in turn create magnetic fields of their own. The polarity of the magnetic field associated with the eddy currents is at each instant opposite to that of the inductive loop. This results in a partial cancellation of the magnetic field produced by the alternating current in the inductive loop. This partial cancellation therefore causes less energy to be stored in the loop's magnetic field and therefore the inductance of the loop decreases. In a typical single six foot (1.83 meters) square, 70 microhenry loop for example, it is typical to observe an inductance decrease of about 3½ microhenries for automobiles, 70 nanohenries for small motorcycles, and 15 nanohenries for bicycles.

There are several problems, however, which occur due to the use of an inductive loop in a traffic roadway. The multiturn wire loop is embedded in the surface of the pavement of the lane in which surveillance is desired. The wire conductors of the loop are generally laid into a narrow slot which is saw-cut into the pavement surface. The narrow slot is then sealed with an epoxy, urethane rubber, bitumen or similar material. The sealing of the narrow slot is to prevent loop wire movement. Any translation or flexure in the loop wire can cause spurious reductions in inductance with the result of false detections of vehicles. The sealing is also necessary to block water flow to the conductors since the presence of water can also alter the effective inductance of the wire loop. Another problem of an inductive loop sensor is that it is a relatively large aperture sensing device. That is, since an approximately six foot (1.83 meters) square loop is generally used, the position resolution of the sensor cannot be less than the six foot (1.83 meters) square. This reduces a vehicle count accuracy due to the low resolution of the large sampling area. A further problem with a loop sensor is that its performance depends upon the quality of the pavement surface. Any movement of the paving surface due to fractures can cause false detections. Similarly it is generally not feasible to utilize loop sensors on roadways which are unpaved or where the paving material is discontinuous, such as in cobblestones, bricks, rock or gravel. A still further disadvantage of an inductive loop sensor is that the process of sawcutting the narrow slot into which the inductive loop sensor wires are laid does considerable damage to the pavement. This results in a shortening of the pavement life and a deterioration in the surface quality of the pavement. A still further problem with inductive loop sensors is that the life of the wires utilized in the inductive loop sensors is relatively short. Frost heave, surface erosion, snowplows, chemical attack, pavement flow, all combine to damage the wires of the inductive loop sensor and may cause it to provide intermittent or continuous opens or leaks.

There are, of course, a wide variety of loops, sensors and wire configurations which may be utilized to produce a loop sensor. One example of a wire configuration which may be used as an inductive loop sensor is illustrated in U.S. Pat. No. 3,984,764, S. J. Koerner, Inductive Loop Structure for Detecting the Presence of Vehicles Over a Roadway, which issued on Oct. 5, 1976, which is hereby incorporated by reference.

Another means of detecting the presence of ferromagnetic materials, vehicles, are magnetometers and typically flux gate magnetometers. An example of a magnetometer is described in U.S. Pat. No. 3,249,915, R. J. Koerner, Method and Apparatus for Vehicle Detection issued May 3, 1966, which is hereby incorporated by reference. A magnetometer is a device inserted in the surface of a roadway to detect changes in the flux lines of the earth's magnetic field. Normally, the earth's magnetic field produces uniformly-spaced flux lines in a given relatively small surveillance area. The presence of a ferromagnetic material, a vehicle, warps the flux lines produced by the earth's magnetic field. Since the ferromagnetic material represents a path of lower reluctance for the flux lines, the flux lines are warped with more of the flux lines passing through the cross-sectional area of the ferromagnetic material than would normally pass through the same area without the presence of the ferromagnetic material. A typical magnetometer has a primary and a secondary winding. The secondary winding is D.C. biased to provide the proper operating point in relation to the intensity and direction of the earth's magnetic field at the point on the earth's surface where the surveillance area is located. The primary winding of the magnetometer is excited with an alternating current field at a frequency F. This produces a signal on the secondary winding at a frequency 2F. The amplitude and phase of the signal present on the secondary winding of the magnetometer varies in conjunction with the presence or passage of a ferromagnetic material through the surveillance area. One example of a magnetometer of this type is described in U.S. Pat. No. 3,319,161, J. C. Beynon, Flux Gate Magnetometer Utilizing a Thin Helical Strip of Magnetic Material as its Core, which issued on May 9, 1967.

The use of magnetometers has the advantage in that the package is relatively small and compact having a diameter typically of only one or two inches and a length of only five or six inches. Thus, it is not necessary to require long saw cuts in the paving material in order to produce the narrow slots to accomodate the wire conductor of an inductive loop sensor. However, magnetometers also suffer a significant disadvantage. First, it is a precision operation and very time-consuming to adjust the bias of a particular magnetometer for its proper operation in relation to the magnitude of the earth's magnetic field and the angle of incidence of the magnetic flux lines to the magnetometer at a particular surveillance location. Secondly, the flux gate magnetometer is not a simple device; it requires two primary windings and two secondary windings with an alternating current excitation of the primary winding and a D.C. bias to the secondary winding. This more complex construction necessitates the use of a four-wire cable to connect the magnetometer to a detector while an inductive loop requires only a two-wire cable. Further, the sensitivity of magnetometers varies inversely with the number of magnetometers coupled together. Thus, if two magnetometers were coupled together, the sensitivity of the combination would be half of the sensitivity of either alone. The characteristics which magnetometers and inductive loops manifest are different and not compatible.

Thus, it would be highly desirable to develop a structure which has the approximate size and configuration of a magnetometer and which will work with existing loop detection equipment. Such a device would have the advantages of a relatively small aperture sensing area, the operation of the system would not depend upon the quality of the pavement surface, the device could be installed on unpaved roads, the quality and longevity of the pavement would not be reduced due to the necessity for making saw cuts and the longevity of the device would be increased because it would not be subject to flexing of the roadway over a large surface area. Such a device has the further advantage in that it can be used with wellknown loop detector sensors and it could be retrofitted in existing applications. The device would not require the precise adjustment techniques required of existing magnetometers.

One example of an inductive loop detector which may be utilized in conjunction with an inductive loop to detect the presence of a ferromagnetic material is described in U.S. Pat. No. 3,989,932, R. J. Koerner, Inductive Loop Vehicle Detector which issued on Nov. 2, 1976, which is hereby incorporated by reference. In general, the inductive loop detector in the '932 patent has an oscillator circuit connected to the loop sensor for oscillating the loop at a frequency depending upon the inductance of the loop. It has a timing means for measuring the time duration of a fixed number of cycles of the oscillator circuit, and a reference determinator defining a reference duration, a comparator for determining the difference between the measured time duration and the reference duration, and a threshold determinator responsive to the difference exceeding a threshold value for generating a signal indicative of the presence of a vehicle in a specified area. Since the inductive loop detector operates by measuring changes in the frequency of oscillation of a resonant circuit, a change in inductance in the loop sensor will cause a change in the frequency of oscillation allowing the inductive loop vehicle detector described in the '932 patent to operate.

SUMMARY OF THE INVENTION

The present invention relates to an apparatus for detecting a ferromagnetic material in a predetermined area. A converter is utilized having an impedance responsive to the magnetic field intensity of the earth to be utilized for converting changes in the magnetic field intensity of the earth into a change in impedance. The converter is coupled to a detector for monitoring the impedance and for generating a signal indicative of the detection of the ferromagnetic material in the predetermined area responsive to the change in the impedance. Typically, the impedance change is caused by a change in inductance.

The converter may have an open magnetic structure having a BH curve with a non-linear portion biased by the magnetic field intensity of the earth near the non-linear portion of the BH curve. Further, the open magnetic structure may have a core having an axis at least partially aligned with the magnetic flux lines of the earth's magnetic field consisting essentially of a highly permeable material which approaches saturation under the influence of the earth's magnetic field and a coil having a conductor wound in at least one turn around the axis of the core. Typically, the axis of the open magnetic structure is substantially vertical, but may be utilized in any position where the axis is not completely orthogonal to the magnetic flux lines of the earth's magnetic field. The core of the open magnetic structure typically has a length along the axis which is much larger than its thickness. Typically, the core length is 1500 times its thickness. Under such circumstances, the core approaches saturation flux density under the influence of the earth's magnetic field.

The core may be constructed from a strip of material wound on the inside of a non-magnetic tube. The strip may have a thickness of about one mil and a width of about 62 mils wound into a helix forming a wound length of approximately 1½ inches. The material forming the strip may be constructed from an iron nickel alloy and typically from an iron nickel molybdenum alloy which is approximately 80% nickel. An example of a material which may be utilized is 4–79 molybdenum PERMALLOY.

The present invention relates to a device which is adapted to be connected to a detector for detecting a ferromagnetic material in a surveillance area, the device for providing a change in impedance in response to the ferromagnetic material having a converter producing a changed impedance responsive to a change in the magnetic field intensity of the earth.

The device and apparatus may be particularly utilized where the ferromagnetic material is a vehicle and the surveillance area is a portion of a roadway. The apparatus or device may be utilized in vertical juxtaposition to the surveillance area in which case a decrease in inductance will signal the arrival of a vehicle to the surveillance area. Or, the apparatus or device may be utilized in conjunction with a roadway which has a pair of lanes, each having a surveillance area with the apparatus or device positioned between the pair of lanes. In this instance, an increase in inductance would signal the presence or arrival of a vehicle in one of the surveillance areas, or conversely a decrease in inductance would signal the departure of a vehicle from the surveillance areas.

The apparatus or device is typically configured to be located in the pavement below the surface of a roadway at or near the traffic lane containing the surveillance area. Since a small magnetometer size probe is utilized, the typical disadvantages of an inductive detector related to, e.g., large aperture, quality of pavement surface, discontinuous paving material, necessity to use saw cuts, flexure of the pavement surface, and the opportunity for moisture to enter the roadway surface are eliminated. At the same time, the apparatus produces a change in inductance of the same type and magnitude as that produced by inductive loop sensors and may be utilized with existing loop detectors.

BRIEF DESCRIPTION OF THE DRAWINGS

The foregoing advantages, construction and operation of the present invention will become more readily apparant from the following description and accompanying drawings, in which.

DESCRIPTION OF THE PREFERRED EMBODIMENTS

Figure 1:
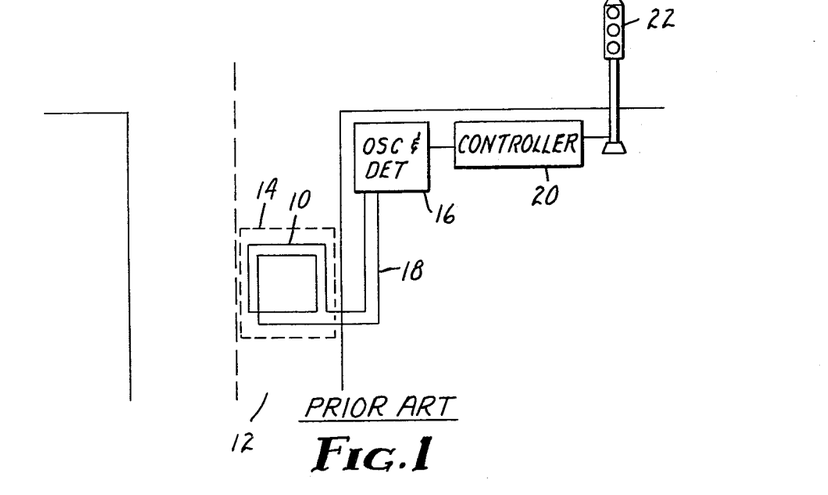
FIG. 1 is a top view of a prior art inductive loop sensor.

FIG. 1 illustrates a typical prior art installation of an inductive loop 10 buried in a roadway 12 below a surveillance area 14. The loop is connected to an oscillator and detector 16 with wires 18. The presence of a vehicle over the surveillance area 14 causes a decrease in inductance of the inductive loop 10 which is transmitted along wires 18 to the oscillator and detector 16. If the magnitude of the decrease in inductance is greater than a predetermined or adapted threshold, the oscillator and detector 16 will send a call signal to a controller 20. The controller 20 then operates in its normal fashion to control a traffic signal 22 at the intersection.

While FIG. 1 illustrates one inductive loop 10 utilized in one surveillance area 14 coupled to one oscillator and detector 16, it is to be understood that typical applications could involve the use of a plurality of inductive loops 10 per surveillance area 14 and the use of a plurality of surveillance areas 14 with at least one inductive loop 10 detecting each surveillance area 14. Similarly, the intersection being controlled may have a plurality of traffic signals 22.

Figure 2:
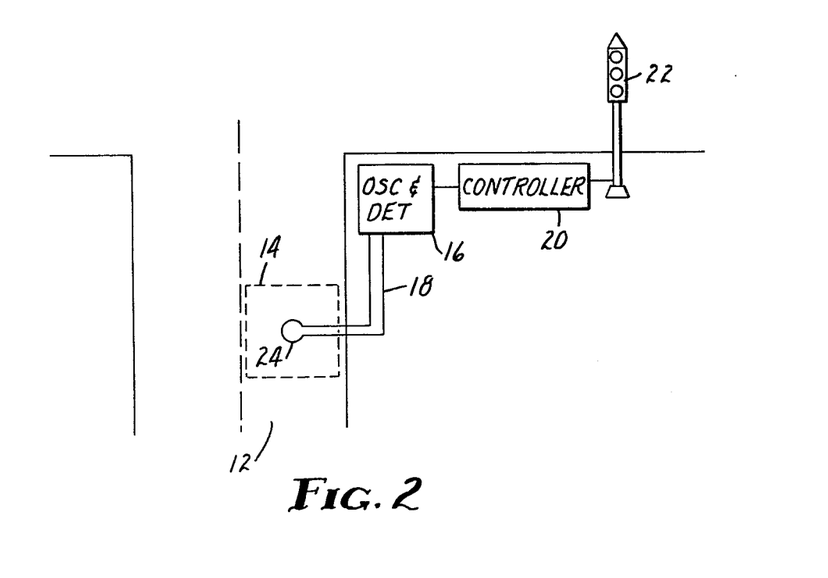
FIG. 2 is a top view of a device of the present invention coupled to a loop detector.

FIG. 2 illustrates the microloop 24 of the present invention buried in a roadway 12 within the surveillance area 14. The microloop 24 is connected to the oscillator and detector 16 with wires 18 as in FIG. 1. Also as in FIG. 1, a call signal is issued to a controller 20 which in turn operates the traffic signal 22 in response to vehicular traffic in the surveillance area 14.

Figure 3:
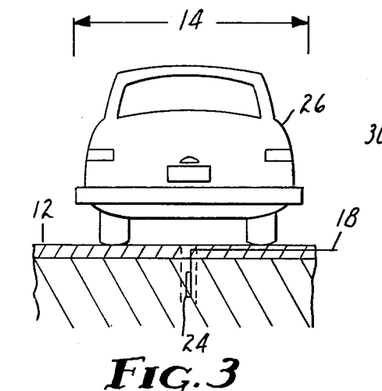
FIG. 3 is a side view of a device of the present invention located in a roadway.

FIG. 3 illustrates the placement of the microloop 24 with respect to a roadway 12. A vehicle 26 is illustrated in the center of the surveillance area 14 with the microloop 24 buried in the roadway 12 in a hole bored for that purpose. The wires 18 connecting the microloop 24 to the oscillator and detector 16 (not shown) are illustrated as being saw cut into the surface of the roadway 12. The microloop 24 will operate to convert changes in the magnetic field intensity of the earth into a change in impedance and, in a preferred embodiment, to a change in inductance. In order to facilitate an understanding of this change, it is necessary to illustrate the magnetic flux lines which comprise the earth's magnetic field and how these magnetic flux lines are modified when a ferromagnetic material comes within the influence of the magentic flux lines.

Figure 4:
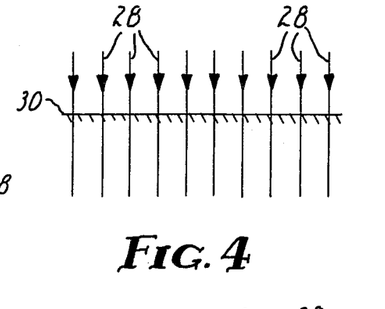
FIG. 4 is a side view of the earth's undisturbed magnetic flux lines.

FIG. 4 illustrates a side view of the earth's magnetic flux lines 28 as they intercept the earth's surface 30. The earth's surface 30 may, of course, be represented by the surface of a roadway 12, as illustrated in FIGS. 1 through 3. With no ferromagnetic material present in the diagram illustrated in FIG. 4, the magnetic flux lines 28 are uniformly spaced and, over this relatively small cross-section, are substantially parallel. The magnetic flux lines 28 as illustrated in FIG. 4 have been depicted to be substantially normal to the earth's surface 30. Under actual operating conditions, the magnetic flux lines 28 may not actually maintain this normal orientation. Depending upon the location on the earth's surface and its relation to the magnetic equator and the magnetic poles, the angle at which the magnetic flux lines 28 pierce the earth's surface may vary from nearly orthogonal to nearly parallel (at the magnetic equator). For purposes of illustration, the orthogonal arrangement depicted in FIG. 4 will suffice. In an actual installation, it is necessary only that the microloop 24 have its long (major) axis oriented at least partially in line with the magnetic flux lines at that point on the earth's surface. For example, if the microloop 24 were installed normal to the surface of the earth 30, the microloop would work at all locations on the earth's surface, except those locations very near the magnetic equator. Of course, the maximum sensitivity will be obtained when the long (major) axis of the microloop 24 is oriented exactly with the direction of the magnetic flux lines 28 at the particular location where it is operating. A somewhat degraded operation, however, but still functional, may be obtained when the angle between the long axis of the microloop 24 and the magnetic flux lines 28 is less than 90 degrees.

Figure 5:
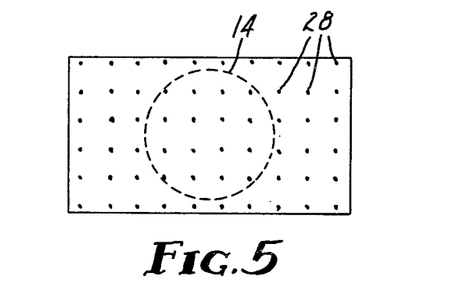
FIG. 5 is a top sectional view of the earth's undisturbed magnetic flux lines.

FIG. 5 illustrates a top view of the magnetic flux lines 28 previously illustrated in FIG. 4. Shown as dots piercing the earth's surface 30, the magnetic flux lines are equally spaced and uniform over the entire area depicted and approximately sixteen (16) magnetic flux lines are shown to intercept the surveillance area 14.

Figure 6:
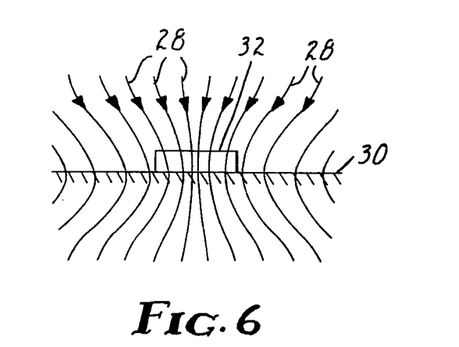
FIG. 6 is a side view of the earth's magnetic flux lines with a ferromagnetic object present.

FIG. 6 represents a corresponding diagram to that represented in FIG. 4, but with a ferromagnetic material 32 within the surveillance area 14. Again, the magnetic flux lines 28 are shown piercing the earth's surface 30. The magnetic flux lines 28, however, instead of being uniformly distributed and being substantially parallel to each other, have taken a distorted shape. Because the ferromagnetic material 32 represents a path of lower reluctance for the magnetic flux lines 28, the magnetic flux lines 28 are drawn to it and pass through it rather than take their usual uniformly distributed paths. As can be seen in FIG. 6, this causes a gathering or a bunching of the magnetic flux lines 28 to the area where the ferromagnetic material 32 is positioned.

Figure 7:
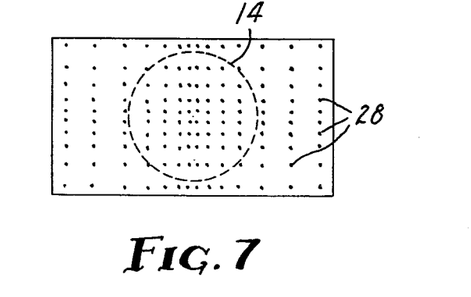
FIG. 7 is a top view of the earth's magnetic flux lines with a ferromagnetic material present.

FIG. 7 is a view similar to that of FIG. 5 showing the effect of the number of magnetic flux lines 28 piercing the surveillance area 14 illustrated in FIG. 5. Again, the magnetic flux lines 28 are shown as dots piercing the earth's surface. Because the ferromagnetic material 32 of FIG. 6 has caused a gathering or a bunching of the magnetic flux lines 28, to its proximity, it can be seen in FIG. 7 that a greater number of magnetic flux lines 28 are contained within the surveillance area 14 and that in particular approximately sixty (60) magnetic flux lines are shown to intercept surveillance area 14. This change in the number of the magnetic flux lines 28 intercepting the surveillance area 14 represents an increase in the magnetic field intensity within the surveillance area 14.

Figure 8:
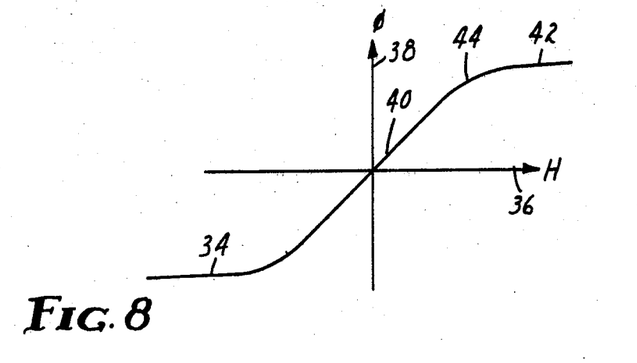
FIG. 8 is a BH curve illustrating the magnetic characteristics of a device of the present invention.

FIG. 8 illustrates a BH curve 34 for a hypothetical ferromagnetic material without hysteresis. The H axis represents the magnetic field intensity 36 and the B axis represents magnetic flux density 38. As is typical for ferromagnetic material, the BH curve is not linear. The curve has a particular slope as it passes through, or near, the zero point on the BH curve but as the magnetic field intensity increases, the material approaches saturation, the slope decreases and the curve becomes asymptotic to the saturation magnetic flux density of the ferromagnetic material. Assuming forward magnetic field intensity 36 bias, the point at which the curve 34 is most non-linear between its portion of slope 40 to its asymptote 42 is called the saturation knee 44 of the curve 34.

Figure 9:
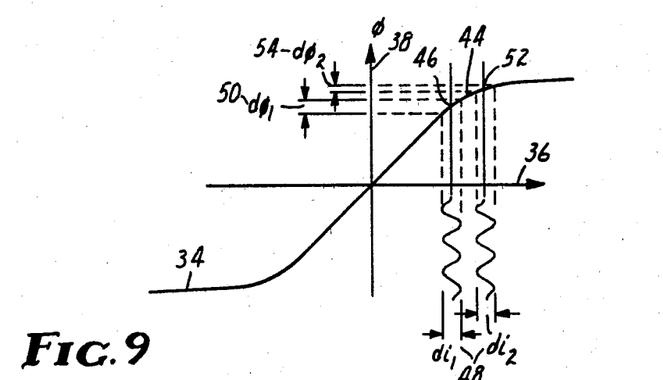
FIG. 9 is a BH curve with AC excitation.

FIG. 9 illustrates the same BH Curve 34. Again, the horizontal axis is magnetic field intensity 36 and the vertical axis is magnetic flux density 38. Assume that a ferromagnetic material is placed within the influence of the earth's magnetic field, and that the saturation knee 44 of the BH curve 34 occurs at approximately the magnetic field intensity of the component of the earth's magnetic field, which is aligned with the long (major) axis of the ferromagnetic material. Assume that the component of the earth's magnetic field, which is influencing the ferromagnetic device biases the BH curve 34 to point 46 near the saturation knee 44. Also assume that a coil of wire is wound on the ferromagnetic material and that an alternating current is induced therein. This alternating current will produce a varying magnetic field intensity 48 superimposed upon the magnetic field intensity of the earth. The magnetic field intensity will vary around point 46 and due to the slope of the BH curve 34 at that point, will cause a varying magnetic flux density 50 as illustrated in FIG. 9. Now assume that a substantial ferromagnetic material such as a motor vehicle passes over the coil wound ferromagnetic material represented by BH curve 34 causing an increase in the magnetic flux lines 28 of the earth's magnetic field as illustrated in FIG. 7 which cause the biasing of BH curve 34 due to the earth's magnetic field to increase to a higher magnetic field intensity 36 to point 52 along BH curve 34. Since the same A.C. current is still present in the coil of wire, the same varying magnetic field intensity 48 is again shown. Now, however, since the increase in the earth's magnetic field intensity has caused us to move from point 46 on the BH curve 34 to point 52 on the BH curve 34, the same varying magnetic field intensity 48 due to the alternating current produces a much smaller varying magnetic flux density 54 due to the decrease in the slope of the BH curve 34.

Since the time varying magnetic flux density 54, $d\phi_2$, is substantially less than the varying magnetic flux density 50, $d\phi_1$, for the same time varying magnetic field intensity 48, represented by the same time varying current supplied to the coil of wire di, the result is an effective decrease in inductance, $d\phi_2/di < d\phi_1/di$, as seen from the terminals to the coil of wire.

Figure 10:
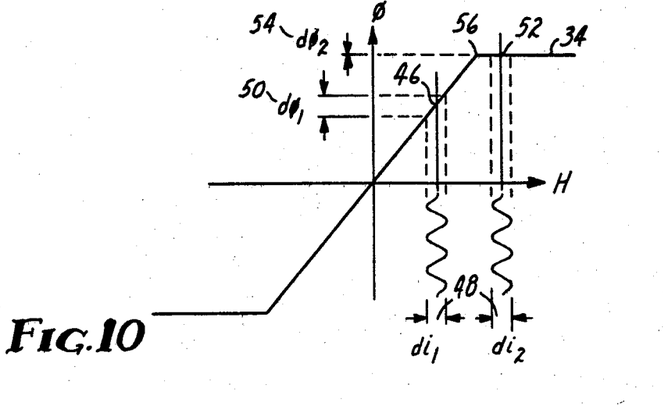
FIG. 10 is a square BH curve.

FIG. 10 illustrates that it is not necessary to have a ferromagnetic material with a BH curve 34 exactly like the one depicted in FIG. 9. In fact, a ferromagnetic material with a BH curve which has at least one non-linear segment, is all that is necessary. It is not necessary that the BH curve 34 be continuously nonlinear nor that the non-linearity occur over a given range. It is necessary, however, that the material be capable of being biased by the component of the earth's magnetic field which affects it at or near the point of non-linearity 56 so that the change in the earth's magnetic field intensity due to the presence of the external ferromagnetic material, a motor vehicle, moves the material along the BH curve 34 from point 46 toward point 52, into or through the non-linearity 56. For purposes herein, a material which approaches saturation shall mean a material meeting the above criteria. In this way, the same time varying magnetic field intensity 48 causes a smaller time varying magnetic flux density 54 with the motor vehicle present than the time varying magnetic flux density 50 without the vehicle present.

Figure 11:
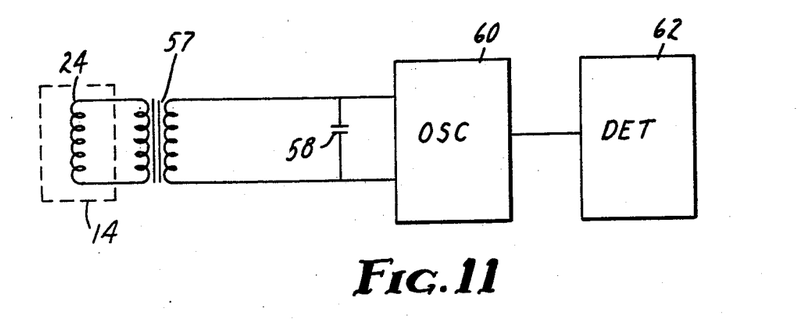
FIG. 11 is a block diagram of an inductive oscillator circuit.

FIG. 11 shows a surveillance area 14 containing the microloop 24 consisting of the ferromagnetic material described in FIGS. 8, 9, and 10 wound with a suitable wire. The microloop 24 is connected through a transformer 57 to an external capacitor 58 which is in turn coupled to an 60 and a detector 62. The microloop 24 and the external capacitor 58 when driven with the 60 comprise a resonant circuit whose resonant frequency is dependent upon both the inductance of the microloop 24 and the external capacitor 58. The transformer 57 is utilized to block any DC current which may be introduced by the oscillator 60. It will be recognized that other circuits may be constructed to sense the inductance or impedance change of the microloop 24. These circuits may or may not contain an external capacitor 58 and may contain the external capacitor 58 coupled in a different manner. Please note that the external capacitor 58 along with the oscillator 60 and detector 62 are exactly those components comprising the oscillator and detector 16 described in FIG. 1 and FIG. 2. The oscillator and detector 16 in FIG. 1 depends upon the changes in inductance of the inductive loop 10. Since the microloop 24 changes its inductance in response to a variation in the earth's magnetic field intensity and therefore due to the presence of a metallic ferromagnetic material, such as a motor vehicle, over it or near it, the capacitor 58, oscillator 60 and detector 62 represent exactly the same components as may be utilized for the oscillator and detector 16 in FIG. 1. An example of an oscillator and detector 16 which may be utilized in conjunction with the present microloop is described in the '932 Koerner patent. Thus it can be seen that the microloop 24 constructed and operating as described may be coupled to the same oscillator and detector 16 as is utilized for existing inductive loop operations, but that it operates upon entirely different principles and is an entirely different structure as will be subsequently seen.

Of course, there may be other devices and materials other than the microloop 24 which perform the same conversion of a change in the magnetic field intensity of the earth into a change of inductance. As an example, a magnetoresistor may be coupled in conjunction with an inductor to perform a similar conversion. The effective inductance as seen by an oscillator is modified due to a change in the resistance of the magnetoresistor, even though the inductor remains constant. Since the magnetoresistor will have a varying resistance, depending upon the magnetic field intensity to which it is subjected, the same modified resonant frequency is obtained, this time with a resistive varying structure.

Figure 12:
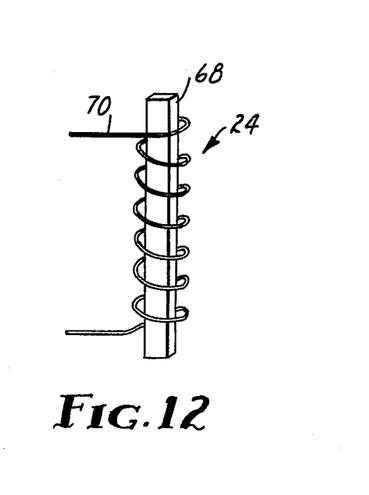
FIG. 12 is a diagram illustrating the structure of the device of the present invention.

The basic structure of the microloop 24 is illustrated in FIG. 12. The microloop 24 consists of a strip of magnetic material 68 having a coil 70 having a conductor surrounding the magnetic material 68. The strip of magnetic material 68 has a substantially elongated shape. The elongated shape is provided in order to minimize the demagnetizing field in the magnetic material. It is preferred that the length of the magnetic material along its major axis be much larger than the smaller of the cross-sectional dimensions of the material. For square or circular cross-sections, of course, it would be preferred that the length be much longer than the width or diameter, respectively. While the longer the better performance wise, it is preferred that much longer mean at least 100 to 1 and in a preferred embodiment is approximately 1500 to 1. It is also preferred that the length of the magnetic material be longer than the greater of the cross-sectional dimensions of the material.

In a preferred embodiment, the magnetic material 68 utilized is an iron nickel alloy and in still another preferred embodiment, the particular iron nickel alloy utilized contains approximately 80% nickel. A Permalloy is a preferred embodiment of magnetic material 68 having these characteristics. In particular, it has been found that 4-79 molybdenum PERMALLOY available from Magnetics, Inc., 1620 Potrero, South ElMonte, Calif. is particularly suitable. In order to appropriately bias the magnetic material near the knee of its hysteresis curve with the magnetic field intensity of the earth, it is generally desirable to have low coercivity, highly permeable material. One known method to lower coercivity and to increase the permeability of a given magnetic material is to anneal it. In a preferred embodiment, the magnetic material is a PERMALLOY which has been annealed and, in particular, 4-79 molybdenum PERMALLOY which has been annealed. In one preferred embodiment the strip of magnetic material 68 is a thin strip approximately 1/16th inch (0.16 centimeters) wide and approximately 1/1000th of an inch (0.0254 millimeters) thick. Typically, the strip may be 1½ inches (3.81 centimeters) long. The material 68 is then wound with coil 70 in one embodiment approximately 35 turns of No. 28 copper wire. Since the thin strip of magnetic material 68 may be constructed from a strip of PERMALLOY approximately 1 mil (0.0254 millimeters) thick, it may be desired to utilize a non-magnetic structure to support the resulting strip. It is desirable that the magnetic material 68 have a coercivity of less than the magnetic field intensity of the earth and also desirable that the coercivity be less than 0.2 oerstads.

Figure 13:
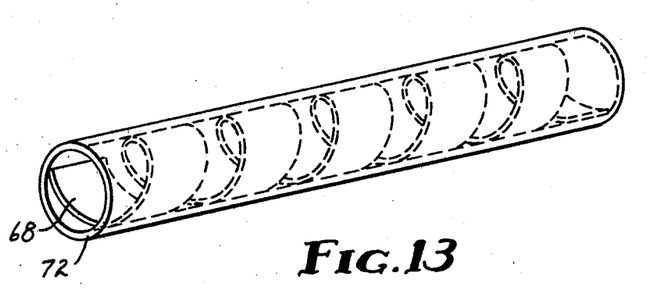
FIG. 13 illustrates how a thin strip of material may be helically wound on the inside of the non-magnetic tube.

In a preferred embodiment, the 1 mil (0.0254 millimeters) thick, 1/16th inch (0.16 centimeters) wide Permalloy material is wound in a helix on the inside of a non-magnetic tube having an approximate inside diameter of 0.039 inches (0.099 centimeters). After being wound into a helix it is again preferred that the Permalloy be annealed. With the magnetic material wound in a helix, it is still preferred that the structure maintain a substantially elongated shape in order to minimize the demagnetizing factor. The preferred criteria of the length being much larger than the smaller of the cross-sectional dimensions and the also preferred criteria of the length being larger than the greater of the cross-sectional dimensions still apply. In the case of the helix structure, the length for purposes of defining the preferred geometry probably is somewhere in between the unwound length of the material and the wound length of the helix. To be conservative, for purposes defined herein the length along the major axis of the magnetic structure shall mean wound length of the helix and the cross-sectional dimensions shall mean the dimensions of the strip of magnetic material. In addition, it is preferred that wound length of the helix be larger than the diameter of the helix. The coil 70 of wire may then be wound around the outside of the non-magnetic tube. This is illustrated in FIG. 13 which shows the magnetic material 68 being wound in a helix on the inside of tube 72. In one preferred embodiment, the non-magnetic tube 72 is constructed from ceramic material. An example of such a helical winding of a thin strip of PERMALLOY material is illustrated in the Beynon patent. The resulting microloop structure typically results in an approximate inductance of five (5) microhenries. The resulting structure in FIG. 13 may then be encapsulated in an inert material to facilate handling and to preserve its structure as it is buried in the surface of a roadway 12 to monitor a surveillance area 14.

In a preferred embodiment the resulting microloop 24 is connected with a detector normally utilized for inductive loops. Since it is typical for the least inductance of inductive loops to be about 18-20 microhenries, it is desired that the microloop 24 be in the same range. This may easily be accomplished by increasing the number of turns of the coil or by adding an additional inductance of about 13-15 microhenries in series with the microloop 24 to bring the effective inductance within the desired range.

Figure 14:
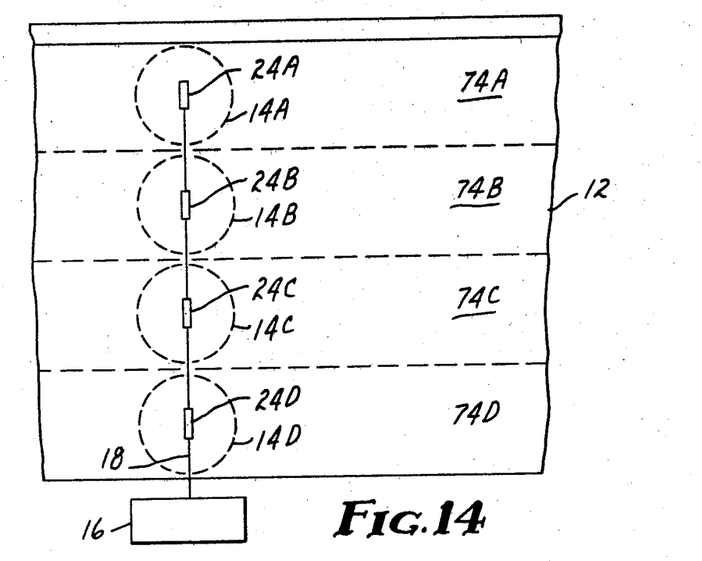
FIG. 14 illustrates a multi-lane configuration with the sensors located at the center of each lane to be detected.

Use of the microloop 24 in a traffic situation may be illustrated in FIG. 14. Here four surveillance areas 14A, 14B, 14C, and 14D are shown, each for vehicle lane 74A, 74B, 74C, and 74D respectively all contained within a roadway 12. In the installation in FIG. 15, a separate microloop 24 is illustrated as contained within each surveillance area 14, thus as illustrated, microloop 24A is contained in surveillance area 14A, microloop 24B is contained within surveillance area 14B, etc. The microloops 24A, 24B, 24C, and 24D are then coupled together with wires 18 and are coupled to the oscillator and detector 16. Constructed in this manner, a motor vehicle driving in lane 74A will pass through surveillance area 14A which will cause microloop 24A to exhibit a decreased inductance. The oscillator and detector 16 will then sense that decreased inductance and properly produce an output. Similar results will be obtained for each of the other lanes.

Figure 15:
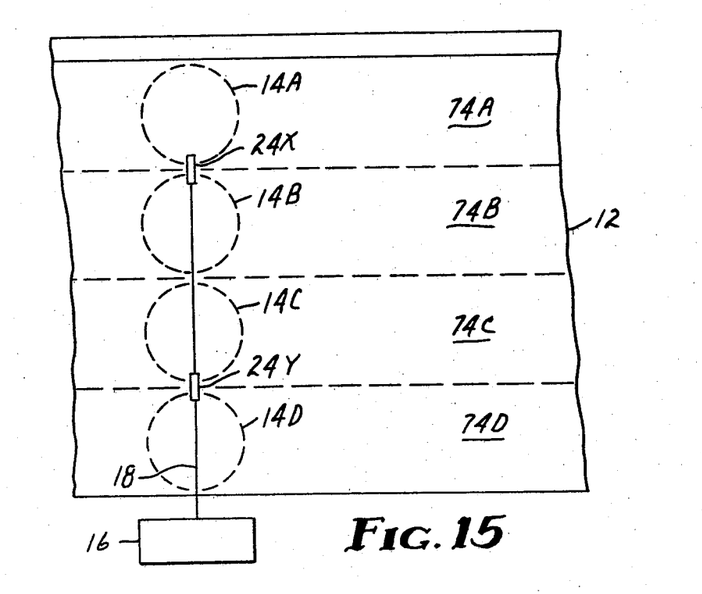
FIG. 15 illustrates a multi-lane configuration with the sensors located between the lanes to be detected.

An alternative arrangement is illustrated in FIG. 15. Again, lanes 74A, 74B, 74C and 74D are illustrated within roadway 12. Still again, surveillance areas 14A, 14B, 14C, and 14D are shown illustrated within each of the respective lanes 74A, 74B, 74C, and 74D. However, in this arrangement, instead of placing a separate microloop 24 within each of these surveillance areas 14, a "between-the-lanes" approach is utilized. A microloop 24X is shown located between surveillance area 14A and surveillance area 14B and a microloop 24Y is shown located between surveillance area 14C and surveillance area 14D. A motor vehicle travelling in lane 74A will pass through surveillance area 14A which will cause an increase in magnetic flux density within surveillance area 14A and because those magnetic flux lines have been borrowed from the surrounding area will cause a decrease in magnetic flux lines and hence a decrease in magnetic field intensity at the location of microloop 24X. A decrease in the magnetic field intensity at the location of microloop 24X will cause an increase in the effective inductance of microloop 24X. Microloop 24X and 24Y are connected again along lines 18 to an oscillator and detector 16. The oscillator and detector 16 in this configuration may be constructed to sense an increase in inductance indicating that a motor vehicle has arrived in one of the surveillance areas 14 or the oscillator and detector 16 may be exactly the same as that is in FIG. 15 detecting the departure of a motor vehicle from surveillance area 14A. Similar results are obtained with microloop 24X when a vehicle enters surveillance area 14B and still similarly similar results are obtained for microloop 24Y with respect to surveillance areas 14C and 14D.

Figure 16:
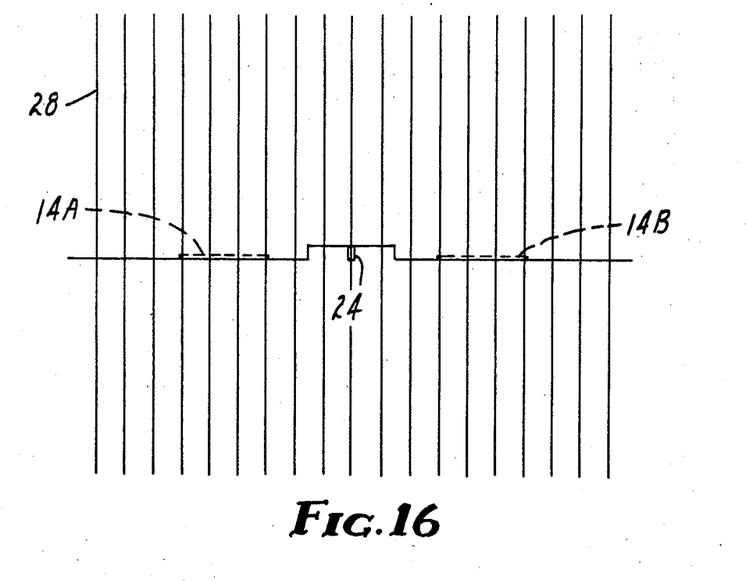
FIG. 16 illustrates a side view of a dual lane detector with no vehicle present.
Figure 17:
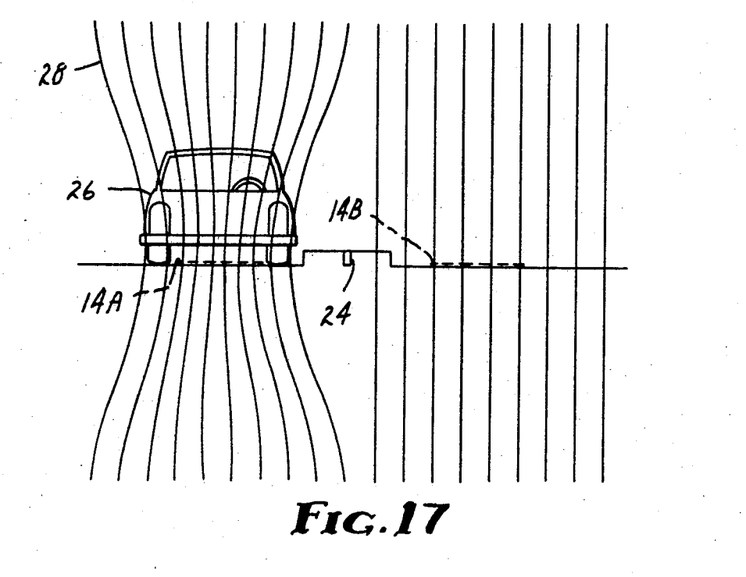
FIG. 17 illustrates a side view of a dual lane detector with a vehicle present in one lane.

FIG. 16 and FIG. 17 further illustrate the "between-the-lanes" approach of FIG. 16. In FIG. 16, the magnetic flux lines 28 are shown uniformly distributed with a microloop 24 disposed between surveillance area 14A and surveillance area 14B. FIG. 17 illustrates the effect on the magnetic flux lines 28 when a vehicle 26 enters surveillance area 14A. Due to the lower reluctance path represented by the ferromagnetic mass of vehicle 26, a greater number of the magnetic flux lines 28 pass through the vehicle 26 and hence a greater number of magnetic flux lines are contained within surveillance area 14A. However, since the number of magnetic flux lines at a given point on the earth's surface is constant, those magnetic flux lines passing through surveillance area 14A must be "borrowed" from the adjacent areas.

Thus, as illustrated in FIG. 18, the location of microloop 24 contains fewer magnetic flux lines 28, resulting in a decrease in magnetic field intensity which would result in an increase in effective inductance.

Thus, it can be seen that there has been shown described a novel apparatus for detecting a ferromagnetic material in a predetermined area. It is to be understood, however, that various changes, modifications, substitutions in the form of the details of the described apparatus can be made by those skilled in the art without departing from the scope of the invention as defined by the following claims.

What is claimed is:

1. A passive device adapted to be connected to a detector for detecting a ferromagnetic material, said device comprising a non-linear impedance responsive to a change in the magnetic field intensity of the earth.

2. A device as in claim 1 wherein said change in impedance is primarily due to a change in inductance.

3. A device as in claim 2 wherein said converter comprises an open magnetic structure having a B-H curve with a non-linear portion biased by said magnetic field intensity near said non-linear portion of said B-H curve.

4. A device as in claim 3 wherein said open magnetic structure comprises:
   a core having an axis at least partially aligned with the magnetic flux lines of the earth's magnetic field, said core consisting essentially of a highly permeable material which approaches saturation under the influence of said magnetic field intensity; and
   a coil having a conductor surrounding said axis of said core.

5. A passive device adapted to be connected to a detector for detecting a ferromagnetic material in the influence of magnetic flux lines of the magnetic field intensity of the earth, comprising:
   a core having a major axis along its largest dimension and having orthogonal cross-sectional axes, said major axis of said core being at least partially aligned with the magnetic flux lines of the earth's magnetic field, said core consisting essentially of a permeable material which approaches saturation under the influence of said magnetic field intensity, said major axis being at least one hundred times greater than the smaller of said orthogonal cross-sectional axes;
   a coil having a conductor surrounding said major axis of said core.

6. A device as in claim 5 wherein said major axis of said core is larger than either of said orthogonal cross-sectional axes.

7. A device as in claim 5 wherein said core has a coercivity of less than said magnetic field intensity.

8. A device as in claim 7 wherein said coercivity is less than 0.2 oersteds.

9. A device as in claim 5 wherein said material is comprised of an iron-nickel alloy.

10. A device as in claim 9 wherein said iron-nickel alloy is approximately 80% nickel.

11. A passive apparatus for detecting a ferromagnetic material in a predetermined area comprising:
    conversion means having a non-linear impedance responsive to the magnetic field intensity of the earth for converting a change in said magnetic field intensity into a change in said impedance; and
    detection means coupled to said conversion means for monitoring said impedance and for generating a signal indicative of the detection of said ferromagnetic material in said predetermined area responsive to said change in said impedance.

12. An apparatus as in claim 11 wherein said change in said impedance is primarily due to a change in inductance.

13. An apparatus as in claim 11 wherein said conversion means comprises an open magnetic structure having a B-H curve with a non-linear portion biased by said magnetic field intensity near said non-linear portion of said B-H curve.

14. An apparatus as in claim 13 wherein said open magnetic structure comprises:
   a core having an axis at least partially aligned with the magnetic flux lines of the earth's magnetic field consisting essentially of a highly permeable material which approaches saturation under the influence of said magnetic field intensity; and
   a coil having a conductor surrounding said axis of said core.

15. A passive apparatus for detecting a ferromagnetic material comprising:
   a core having a major axis along its largest dimension and having orthogonal cross-sectional axes, said major axis of said core being at least partially aligned with the magnetic flux lines of the earth's magnetic field, said core consisting essentially of a permeable material which approaches saturation under the influence of said magnetic field intensity, said major axis being much larger than the smaller of said orthogonal cross-sectional axes;
   a coil having a conductor surrounding said major axis of said core;
   said coil and said core having an impedance measured from said coil; and
   detection means coupled to said coil for monitoring impedance and for generating a signal indicative of the detection of said ferromagnetic material responsive to a change in said impedance.

16. An apparatus as in claim 15 wherein said major axis of said core is longer than either of said orthogonal cross-sectional axes.

17. An apparatus as in claim 15 wherein said major axis is at least one hundred times greater than the smaller of said orthogonal cross-sectional axes.

18. An apparatus as in claim 17 wherein said core has a coercivity of less than said magnetic field intensity.

19. An apparatus as in claim 18 wherein said coercivity is less than 0.2 oerstads.

20. An apparatus as in claim 18 wherein said core is a strip of material wound on the inside of a nonmagnetic tube.

21. An apparatus as in claim 20 wherein said strip has a thickness of about 1 mil and a width of about 62 mils wound into a helix forming a wound length of about one and one-half inches.

22. An apparatus as in claim 17 wherein said material is comprised of an iron-nickel alloy.

23. An apparatus as in claim 22 wherein said iron-nickel alloy is approximately 80% nickel.

24. An apparatus as in claim 15 wherein said detection means comprises:
   an oscillator operatively coupled to said conversion means for oscillating at a frequency dependant on said impedance; and
   a detector operatively coupled to said oscillator for detecting changes in said frequency.

25. A passive apparatus for detecting a vehicle in a surveillance area of a roadway comprising:
   conversion means having a non-linear impedance responsive to the magnetic field intensity of the earth for converting changes in said magnetic field intensity into a change in said impedance; and
   detection means coupled to said conversion means for monitoring said impedance and for generating a signal indicative of the detection of said ferromagnetic material in said predetermined area responsive to said change in said impedance.

26. An apparatus as in claim 25 wherein said change in said impedance is primarily due to a change in inductance.

27. An apparatus as in claim 26 wherein said conversion means comprises an open magnetic structure having a B-H curve with a non-linear portion biased by magnetic field intensity near said non-linear portion biased by magnetic field intensity near said non-linear portion of said B-H curve.

28. A passive apparatus for detecting a vehicle in a surveillance area of a roadway comprising:
   a core having a major axis along its largest dimension and having orthogonal cross-sectional axes, said major axis of said core being at least partially aligned with the magnetic flux lines of the earth's magnetic field, said core consisting essentially of a permeable material which approaches saturation under the influence of said magnetic field intensity, said major axis being at 100 times the smaller of said orthogonal cross-sectional axes;
   a coil having a conductor surrounding said major axis of said core;
   said coil and said core having a impedance measured from said coil; and
   detection means coupled to said coil for monitoring said impedance and for generating a signal indicative of the detection of said ferromagnetic material responsive to a change in said impedance.

29. An apparatus as in claim 28 wherein said major axis of said core is larger than either of said cross-sectional axes.

30. An apparatus as in claim 28 wherein said core has a coercivity of less than said magnetic field intensity.

31. An apparatus as in claim 30 wherein said coercivity is less than 0.2 oerstads.

32. An apparatus as in claim 28 wherein said core is a strip of material wound on the inside of a nonmagnetic tube.

33. An apparatus as in claim 32 wherein said strip has a thickness of about 1 mil and a width of about 62 mils wound into a helix forming a wound length of about one and one-half inches.

34. An apparatus as in claim 33 wherein said material is comprised of an iron-nickel alloy.

35. An apparatus as in claim 34 wherein said iron-nickel alloy is approximately 80% nickel.

36. An apparatus as in claim 28 wherein said change in said impedance is due to a decrease in said inductance as said vehicle arrives in said predetermined area of said roadway.

37. An apparatus as in claim 36 wherein said conversion means is located in vertical juxtaposition to said surveillance area.

38. An apparatus as in claim 28 wherein said change in said impedance is due to an increase in said inductance as said vehicle arrives in said surveillance area.

39. An apparatus as in claim 38 wherein said roadway has a pair of lanes each having a surveillance area located within each of said pair of lanes and wherein said conversion means is located between said pair of lanes.

40. An apparatus as in claim 28 wherein said detection means comprises:
an oscillator operatively coupled to said conversion means for oscillating at a frequency dependent on said impedance of said conversion means; and
a detector operatively coupled to said oscillator for detecting changes in said frequency.

* * * * *

UNITED STATES PATENT AND TRADEMARK OFFICE
CERTIFICATE OF CORRECTION

PATENT NO. : 4,449,115
DATED : May 15, 1984
INVENTOR(S) : RALPH J. KOERNER

It is certified that error appears in the above-identified patent and that said Letters Patent is hereby corrected as shown below:

Col. 8, line 63, before "60" insert -- oscillator --.

Col. 14, line 30, before "100" insert -- least --.

Signed and Sealed this

Twenty-third Day of October 1984

[SEAL]

Attest:

GERALD J. MOSSINGHOFF

Attesting Officer

Commissioner of Patents and Trademarks